United States Patent
Skelton (10) Patent No.: US 12,265,569 B2
(45) Date of Patent: Apr. 1, 2025

(54) RULE BASED DE-DUPLICATION OF SOFTWARE SYSTEM DEFECTS

(71) Applicant: Bugcrowd Inc., San Francisco, CA (US)

(72) Inventor: Michael Skelton, Pimpama (AU)

(73) Assignee: BUGCROWD INC., San Francisco, CA (US)

(*) Notice: Subject to any disclaimer, the term of this patent is extended or adjusted under 35 U.S.C. 154(b) by 0 days.

(21) Appl. No.: 18/179,170

(22) Filed: Mar. 6, 2023

(65) Prior Publication Data
US 2023/0281233 A1 Sep. 7, 2023

Related U.S. Application Data

(60) Provisional application No. 63/317,463, filed on Mar. 7, 2022.

(51) Int. Cl.
| | | |
|---|---|---|
| G06F 16/338 | (2019.01) | |
| G06F 11/36 | (2006.01) | |
| G06F 11/3604 | (2025.01) | |
| G06F 11/3668 | (2025.01) | |
| G06F 16/215 | (2019.01) | |
| G06F 40/194 | (2020.01) | |
| G06F 40/20 | (2020.01) | |

(52) U.S. Cl.
CPC ........ G06F 16/338 (2019.01); G06F 11/3604 (2013.01); G06F 11/3692 (2013.01); G06F 16/215 (2019.01); G06F 40/194 (2020.01); G06F 40/20 (2020.01)

(58) Field of Classification Search
None
See application file for complete search history.

(56) References Cited

U.S. PATENT DOCUMENTS

| | | |
|---|---|---|
| 9,876,746 B2 | 1/2018 | Wideman |
| 9,959,199 B2 | 5/2018 | Ignatyev et al. |
| 10,379,999 B2 | 8/2019 | Bagal et al. |
| 10,705,795 B2 | 7/2020 | Podder et al. |
| 10,789,149 B2 | 9/2020 | Bagal et al. |
| 11,036,867 B2 | 6/2021 | Bhatia et al. |

(Continued)

OTHER PUBLICATIONS

Chun-Hua Cao et al., "DBSCAN-Based Automatic De-Duplication for Software Quality Inspection Data", Feb. 17, 2022, IEEE, pp. 17882-17890 (Year: 2022).*

(Continued)

*Primary Examiner* — Jared M Bibbee
(74) *Attorney, Agent, or Firm* — FENWICK & WEST LLP (57) ABSTRACT

A system allows users to submit information describing system defects, for example, defects in software systems. The system stores information describing defects for multiple external systems. The system further allows users to specify de-duplication rules for determining duplicate defects submitted by users. A de-duplication rule is associated with an original system defect and specifies regular expressions that are evaluated against a target system defect. The evaluation of the regular expressions against the target system defect indicates whether the target system defect is a duplicate of the original system defect. If the target system defect is determined to be a duplicate of another existing system defect, the target system defect may be closed.

20 Claims, 7 Drawing Sheets

(56) References Cited

U.S. PATENT DOCUMENTS

| | | |
|---|---|---|
| 11,157,390 B2 | 10/2021 | Acharyya et al. |
| 11,874,882 B2 | 1/2024 | Xiong et al. |
| 2015/0261792 A1* | 9/2015 | Attarde ................ G06F 16/215 707/616 |
| 2016/0371173 A1 | 12/2016 | Ignatyev et al. |
| 2017/0199803 A1 | 7/2017 | Bagal et al. |
| 2018/0173495 A1 | 6/2018 | Podder et al. |
| 2019/0235987 A1 | 8/2019 | Bagal et al. |
| 2020/0409819 A1 | 12/2020 | Acharyya et al. |
| 2021/0004416 A1 | 1/2021 | Xiong et al. |
| 2021/0073655 A1 | 3/2021 | Portisch et al. |
| 2021/0117393 A1* | 4/2021 | Patel ................... G06F 16/215 |
| 2023/0281233 A1 | 9/2023 | Skelton |
| 2024/0193072 A1 | 6/2024 | Kanta et al. |

OTHER PUBLICATIONS

Hafsa Zafar et al., "Finding Focused Itemsets from Software Defect Data", IEEE, pp. 1-6 (Year: 2012).*

Banerjee, S. et al., "Automated Duplicate Bug Report Classification using Subsequence Matching," 2012 IEEE 14th International Symposium on High-Assurance Systems Engineering, Oct. 2012, pp. 74-81.

Jalbert, N. et al., "Automated Duplicate Detection for Bug Tracking Systems," International Conference on Dependable Systems & Networks: Anchorage, Alaska, Jun. 2008, pp. 52-61.

Neysiani, B.S. et al., "Efficient feature extraction model for validation performance improvement of duplicate bug report detection in software bug triage systems," Information and Software Technology, vol. 126, May 26, 2020, pp. 1-19.

U.S. Office Action, U.S. Appl. No. 18/179,209, Sep. 10, 2024, 19 pages.

Zhang, T. et al., "A Bug Rule based Technique with Feedback for Classifying Bug Reports," 2011 11th IEEE International Conference on Computer and Information Technology, Aug. 2011, pp. 336-343.

* cited by examiner

RULE BASED DE-DUPLICATION OF SOFTWARE SYSTEM DEFECTS

CROSS REFERENCE TO RELATED APPLICATIONS

This application claims the benefit of priority under 35 USC 119(e) to U.S. Provisional Application No. 63/317,463 filed on Mar. 7, 2022, which is incorporated herein by reference in its entirety for all purposes.

BACKGROUND

Field of Art

This disclosure relates in general to managing software system defects in general and more specifically to rule based de-duplication of software system defects.

Description of the Related Art

Software systems often have defects when the system is released, for example, in production. The defects may be reported by users. The defects are stored in a repository. Developers of the software system review the defects in the repository and modify the source code of the software system to fix the defects. The same defect may be reported by multiple users. As a result, the repository of defects may include multiple representations of the same defect. Different users may report the same defect in a different manner. As a result, it is difficult to identify all the duplicates of a defect. Having multiple representations of the same defect results in waste of computing resources, for example, storage resources as well as developer resources utilized for reviewing, analyzing, and attempting to fix the same defect multiple times.

SUMMARY

A system allows users to submit information describing system defects, for example, defects in software systems. The system stores information describing defects for multiple external systems. The system further allows users to specify de-duplication rules for determining duplicate defects submitted by users.

According to an embodiment, the system stores records describing system defects for a plurality of external systems. Each system defect is associated with an external system. The system configures a user interface for displaying information stored in records describing system defects. The system receives de-duplication rules submitted by users. Each de-duplication rule is configured to receive a description of an input system defect and determine whether the input system defect is a duplicate of an original system defect associated with the de-duplication rule. The de-duplication rule specifies one or more regular expressions. The input system defect is determined to be a duplicate of the original system defect responsive to satisfying the regular expressions.

The system executes a particular de-duplication rule (e.g., R1) configured to determine duplicate system defects for a particular original system defect (e.g., D1) associated with a particular external system (e.g., S1). The system determines whether a target system defect (e.g., D2) specified for the particular external system S1 satisfies the one or more regular expressions specified by the de-duplication rule R1. The system determines based on the execution of the one or more regular expressions that the target system defect D2 specified for the particular external system S1 is a duplicate of the original system defect D1. The system stores in a record describing the target system defect D2, information indicating that the target system defect D2 is a duplicate.

The system may close the system defect D2 once the system determines that defect D2 is a duplicate. Accordingly, the system defect D2 is not used for a typical workflow followed by developers for fixing a system defect.

According to an embodiment, the system performs ranking of rules for de-duplication of system defects. The system stores records describing system defects for external systems. The system further receives de-duplication rules configured to receive a description of an input system defect and determine whether the input system defect is a duplicate of an original system defect associated with the de-duplication rule. According to an embodiment, the de-duplication rule specifies one or more regular expressions. The input system defect is determined to be a duplicate if it matches the one or more regular expressions. The system determines a set of features for each of the plurality of de-duplication rules. The set of features includes a feature based on a number of system defects de-duplicated using the de-duplication rules. The system determines a score indicating a significance of the de-duplication rule based on the set of features. The system identifies a user that submitted the de-duplication rule and performs an interaction with the user based on the score determined for the de-duplication rule.

According to various embodiments, the set of features considered for determining the score for the de-duplication rule includes features describing a particular external system for which the de-duplication rule was specified. For example, the set of features may include one or more of (1) a feature representing a number of system defects for the particular external system that have been submitted, (2) a feature representing a total number of users of the particular external system, (3) a feature representing a number of system features supported by the particular external system, and (4) a feature representing a rate of user interactions of users with the particular external system.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

System Environment

Figure 1:
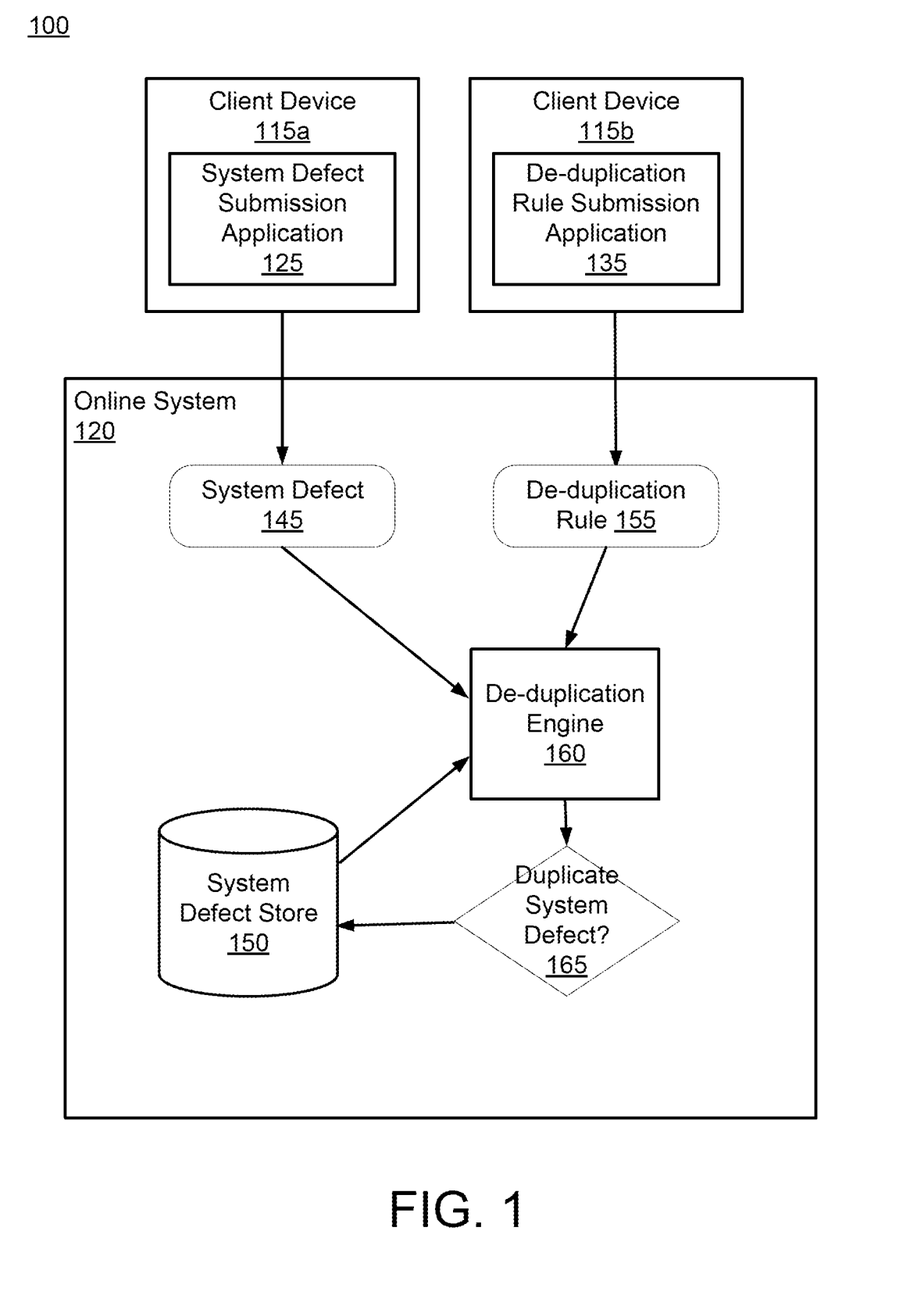
FIG. 1 is a block diagram of a system environment for performing rule-based deduplication of defects, according to an embodiment.

FIG. 1 is a block diagram of a system environment for performing rule-based deduplication of defects, according to an embodiment. The system environment 100 includes an online system 120 that communicates with users via client devices 115. The online system 120 includes a deduplication engine 160 and a system defect store 150. The online system 120 may include other components not shown in FIG. 1, for example, other types of data stores, and so on. The system environment 100 may include other elements not shown in FIG. 1, for example, a network. The online system 120 may be referred to herein as a system. Certain steps of the system may be performed by the system in an offline fashion, for example, without using a network.

The online system 120 allows users to submit system defects in systems, for example, external systems identified by the online system. Accordingly, the online system uses crowdsourcing to identify system defects. The online system 120 stores system defects for multiple external systems.

The online system 120 may send messages to users or interact with users based on their submissions of system defects. For example, the online system may compensate the users for system defects submitted by them. The online system may also communicate with users to report status of system defects reported by the users, for example, if a system defect is determined to be a duplicate of an existing system defect, the online system 120 may communicate with the user that reported the system defect, informing the user of the fact that the system defect was determined to be a duplicate.

Different external systems may have different number of system defects reported by users. A user providing submissions of defects or de-duplication rules is also referred to as a researcher. Typically, the number of system defects of an external system depends on various factors including a length of time that has used the online system 120 for allowing users to submit system defects. Accordingly, typically older systems have more defects stored in the online system 120. The number of defects may also depend on the size and complexity of the external system. For example, larger and complex external systems typically have more system defects stored in the online system. The number of defects may also depend on the popularity of the external system, for example, the number of users of the external system, the rate at which users interact with the external system, and so on. External systems with a large number of defects stored in the online system 120 have a higher likelihood of duplicate system defects being reported. Furthermore, the use of crowdsourcing increases the likelihood of receiving duplicate system defects since users are actively researching to identify system defects and report them.

Receiving duplicate system defects consumes computing resources and human resources of the online system 120 as well as the external system for which the duplicate system defects were reported. For example, duplicate system defects consume storage resources. If the workflow of the duplicate system defect is followed, the system spends resources following the steps for resolving the system defect. Furthermore, developer resources of organizations associated with the external system are used. If at certain stage, a determination is made that the system defect is duplicate, the system defect may be closed. However, any use of computing resources up to that point in time is wasted. The online system according to various embodiments performs early detection of duplicate system defects, thereby improving the efficiency of computing resources of the online systema as well as external systems.

The online system 120 uses de-duplication rules for determining whether a system defect is a duplicate of another system defect. This allows the online system 120 to close duplicate system defects as early as possible in the life cycle of system defects. Furthermore, early detection of duplicates improves the user experience of users submitting the system defects. For example, a researcher that finds out early about the status of a submitted defect is likely to continue performing research and submit more system defects rather than a researcher who does not receive any update from the system for a long time.

The communications of the online system 120 may depend on whether a submission of system defect provided a duplicate system defect or a new system defect that was previously not available in the online system 120. The online system 120 allows external users to submit submissions of de-duplication rules. Accordingly, the online system uses crowd sourcing to obtain de-duplication rules. The online system 120 may send messages to users or interact with users based on their submissions of de-duplication rules. For example, the online system may compensate the users for de-duplication rules submitted by them.

The online system 120 interacts with client applications 125 and 135 that execute on client devices. The client application 125 is a system defect submission application 125 that presents a user interface that allows users to submit system defects 145 to the online system 120. The submitted system defects 145 may be stored in the system defect store 150.

The client application 135 is a de-duplication rule submission application that that presents a user interface that allows users to submit de-duplication rules 155. A de-duplication rule 155 is used to compare two system defect submissions and determine whether the two system defect submissions describe the same system defect. Following is an example of a de-duplication rule.

```
{
  "name" : "Weak login on www.xyz.com" ,
  "matchSubmissionFields" : {
    "bug_url" : { "pattern" "^ ( ( http[ s]?): / /) ?goldendev-cloud\\.arlo\
\.com(\/.•)?" },
    "vrt_id"   : {"pattern" :
    "^broken_auth_and_session_mgnt.weak_login
\\.( http_and_https_available | https_not_available)$";
  },
  "action" : {
    "task" : "change_state" ,
    "newState" : "duplicate" · ,
    "comment" : "weak login duplicate",
    "originalSubmissionRefernceNumber" : "a384700f94"
  }
}
```

The action represents the action that the system should take if the de-duplication rule triggers, for example, as a result of match of the regular expression. For example, if the fields identified in matchSubmissionFields are determined to match the regular expressions specified in matchSubmissionFields for a defect submitted, the action specified in the action field is performed. Accordingly, the task specified in the task field is performed, for example, the state of the submitted defect is changed to the state specified in the newState field (e.g., state changed to duplicate"). Other embodiments can use other representations of de-duplication rules based on different formats (e.g., XML), different fields or attributes as well as different values of attributes.

In an embodiment, the client applications 125 and 135 are web applications that execute using a web browser. However, the client applications 125 and 135 can be other types of applications, for example, applications using proprietary communication protocols to interact with the online system 120.

The de-duplication engine 160 executes the de-duplication rules to identify duplicate system defects. In an embodiment, the de-duplication engine 160 compares any new system defect 145 received by the online system with system defects stored in the system defect store 150 to determine whether the new system defect 145 received matches a previously stored system defect in the system defect store 150. If the de-duplication engine 160 determines 165 that the new system defect 145 is a duplicate of an existing system defect from the system defect store 150, the de-duplication engine 160 may either reject the new system defect 145 or store the new system defect 145 in the system defect store 150 but mark it as a duplicate. Communications performed by the online system with the users submitting the system defects depend on whether the system defect provided by the user is a duplicate of an existing system defect or an entirely new system defect.

The online system 120 and client devices 115 shown in FIG. 1 represent computing devices. A computing device can be a conventional computer system executing, for example, a Microsoft' Windows™-compatible operating system (OS), Apple™ OS X, and/or a Linux OS. A computing device can also be a device such as a personal digital assistant (PDA), mobile telephone, video game system, etc.

The client devices 115 may interact with the multi-tenant system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
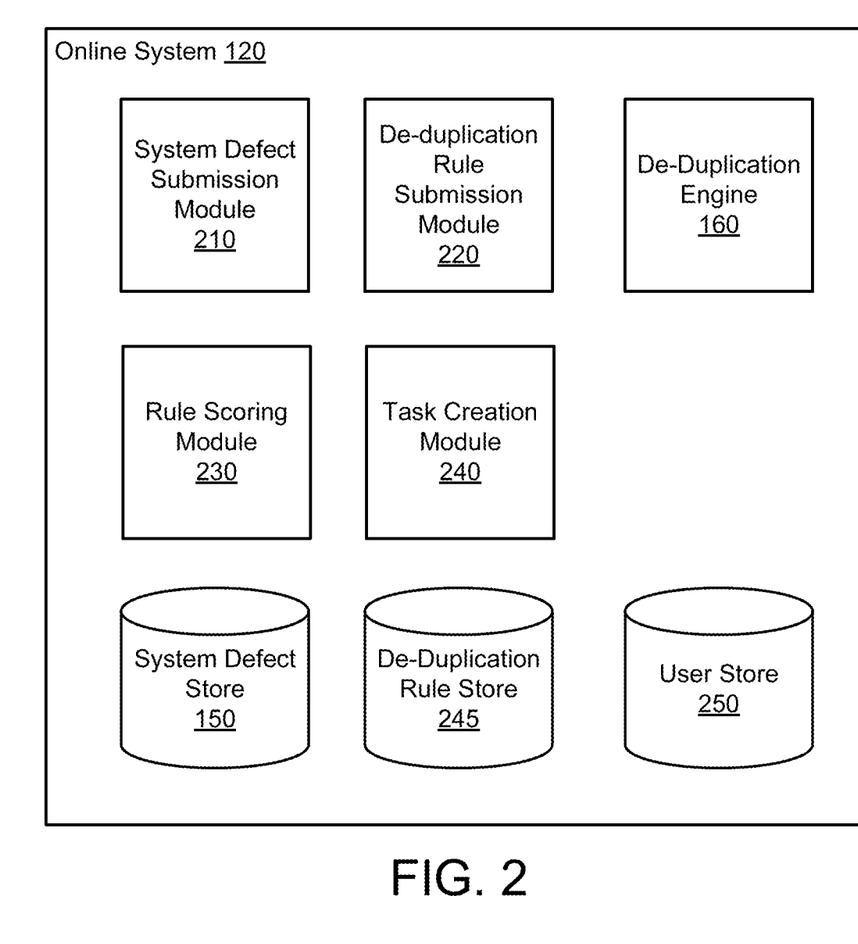
FIG. 2 is a block diagram illustrating components of an online system for performing rule-based deduplication of defects, according to one embodiment.

FIG. 2 is a block diagram illustrating components of an online system for performing rule-based deduplication of defects, according to one embodiment. online system 120 comprises a system defect submission module 210, a de-duplication rule submission module 220, the de-duplication engine 160, a rule ranking module 230, a task creation module 240, a system defect store 150, a de-duplication rule store 245, and a user store 250. Other embodiments can have different and/or other components than the ones described here. Furthermore, the functionalities described herein can be distributed among the components in a different manner.

The system defect store 150 stores system defects submitted by users. In an embodiment, the system defect store 150 is a database, for example, a relational database or a document-based database. The system defects store 150 stores various attributes describing a system defect including information identifying an external system for which the system defect is submitted, information identifying a user that submitted the system defect, a time of submission of the system defect, and so on. In an embodiment, the system defect is specified using unstructured text, for example, natural language description of the system defect. In an embodiment, the system defect store stores a flag indicating whether a system defect is a duplicate of another system defect. In an embodiment, the system defect store 150 stores for a duplicate system defect, an identifier of the earliest system defect that is duplicate of that system defect. If there are multiple system defects that are duplicates of each other, the system stores a flag identifying the earliest reported system defect as the original system defect and the remaining system defects as duplicates. The system defect store 150 may also store information identifying a de-duplication rule used to determine that the system defect is duplicate of another system defect. In an embodiment, the online system closes the duplicate system defects so that only the original system defect is active in the system defect store 150 and all other duplicate system defects are marked as closed or inactive.

The de-duplication rule store 245 stores de-duplication rules. In an embodiment, the system defect store 150 is a database, for example, a relational database. Each de-duplication rule has a unique rule identifier. The system defect store 150 may use the rule identifier as a foreign key for identifying the de-duplication rule used for determining whether a system defect is duplicate of another system defect. Since the de-duplication rules are specified by users via crowd sourcing, de-duplication rule store 245 stores information identifying a user that provided each de-duplication rule and the time when the de-duplication rule was received by the system from the user. In an embodiment, the de-duplication rule store 245 stores statistics associated with a de-duplication rule, The user store 250 stores information describing the users that contribute submissions including submissions of system defects and submissions of de-duplication rules. The user store 250 includes a unique identifier for each user. The unique identifier acts as a foreign key for the records in system defect store 150 and de-duplication rule store 245 to identify the users that provided the corresponding submission.

The system defect submission module 210 configures a user interface and presents it via the system defect submission application 125 displayed via a client device 115. The system defect submission module 210 receives system defects submitted via the user interface of the system defect submission application 125 and provided by a user. The system defect submission module 210 may store the system defect in the system defect store 150. The system defect submission module 210 may invoke the de-duplication engine 160 to determine whether the newly submitted system defect is a duplicate of an existing system defect and then stores the resulting information in the record in the system defect store 150.

The de-duplication rule submission module 220 configures a user interface and presents it via the de-duplication rule submission application 135 displayed via a client device 115. The de-duplication rule submission module 220 receives de-duplication rules submitted via the user interface of the system defect submission application 125 and provided by a user. The de-duplication rule submission module 220 may store the system defect in the system defect store 150.

The de-duplication engine 160 executes the de-duplication rules to determine whether a system defect is a duplicate of another system defect. The de-duplication engine 160 may be invoked for a newly received system defect to determine whether the newly received system defect is a duplicate of an existing de-duplication rule. The de-duplication engine 160 may be invoked periodically to process existing system defects stored in the system defect store 150 to determine whether any system defects are duplicates of other system defects.

The rule scoring module 230 determines a score indicating a significance of a de-duplication rule. The rule scoring module 230 determines the score for a de-duplication rule based on various factors including a measure of a number of system defects that were determined to be duplicate of other system defects by applying the de-duplication rule. In some embodiments, the score of a de-duplication rule also depends on the age of the external system corresponding to the original system defect of the de-duplication rule. The score of a de-duplication rule is directly proportional or directly related to the age of the corresponding external system in the online system. For example, older external systems are given higher score compared to recent systems. The age of the external system represents the length of time for which system defects of the external system are being submitted in the online system 120. This is so because the number of submissions of system defects in the online system grows over time and older external systems in the online system 120 have more system defects and a greater need to identify duplicate system defects. Similarly, the score of a de-duplication rule associated with an external system depends on the number of system defects for the external system that have been submitted and exist in the online system. In an embodiment, the online system receives attributes describing an external system and uses the attributes as factors for determining scores of de-duplication rules for original system defects of the external system. These attributes include a measure of complexity of the external system, a number of users of the external system, a number of system features supported by the external system (using a measure of complexity of the external system such that a complex external system supporting more system features is ranked higher than a less complex external system supporting fewer system features), a rate of user interactions of users with the external system (indicating a measure of how busy the external system is). For example, the score of a deduplication rule for an original system defect associated with an external system is (1) directly proportional or directly related to the complexity of the external system, (2) directly proportional or directly related to the total number of users of the external system, (3) directly proportional or directly related to the number of features supported by the external system, (4) directly proportional or directly related to the rate of user interactions of users with the external system. In an embodiment, the online system determines a score for a de-duplication rule based on a combination of different factors, for example, a weighted aggregate of various factors described herein.

In some embodiments, the online system uses a machine learning model for determining the score for a de-duplication rule. The machine learning based model receives various features identified above and encodes them as a feature vector. For example, the features may be: (1) a number of system defects for the external system that have been submitted in the past with the online system that may be stored in the online system (2) a measure of complexity of the external system, (3) the total number of users of the external system, (4) the number of features supported by the external system, (5) the rate of user interactions of users with the external system, (6) an age of the external system indicating how long the external system has been operational (7) a measure of age of the external system within the online system indicating how long system defects have been submitted within the online system for the external system, (8) a measure of complexity of the system defects submitted for the external system (e.g., an average measure of developer time required to fix system defects submitted for the external system or a measure of an average number of lines of code modified for fixing system defects of the external system) and so on. A training data set is provided as input to the machine learning model. In an embodiment, the machine learning model is a supervised machine learning model that is trained using labeled training data set. The training dataset includes de-duplication rules and corresponding scores for the de-duplication rules that may be determined by experts. The system trains the machine learning based model by adjusting the parameters of the machine learning based model using techniques such as back propagation to minimize a measure of loss between a predicted score for a de-duplication rule from the training dataset and the known score available in the training dataset. The trained machine learning based model is deployed in the system to determine scores of the new de-duplication rules added to the system.

In some embodiments, the machine learning model is a neural network, for example, a multi-layer perceptron. The input provided to the neural network is an encoding of the de-duplication rule as well as encoding of the information describing the rules, for example, the number of times the rule matches, attributes describing the external system associated with the de-duplication rule, and so on. The neural network is trained to predict the score for an input de-duplication rule. The hidden layers of the neural network determine features of the de-duplication rule that are used for determining the score. The trained neural network is deployed in the system to determine scores of the new de-duplication rules added to the system.

The online system performs interactions with users that submitted the de-duplication rule. The interactions are based on the score of the de-duplication rule submitted by the user. For example, the online system may provide compensation (or reward) to the user that submitted the de-duplication rule. In an embodiment, a value of compensation provided to the users that submitted the de-duplication rule is determined based on the score determined for the de-duplication rule. The compensation is determined to encourage submitters to submit de-duplication rules that are effective, instead of submitters focusing on system defects that are likely to be duplicates.

In some embodiments, the system also interacts with users that submitted system defects that are determined to be duplicates of existing system defects based on execution of the de-duplication rules. These interactions may inform the user that submitted the system defect that the system defect submitted by the user was determined to be a duplicate. Accordingly, the system defect will not be submitted for a workflow for fixing the system defect. Furthermore, the user is informed that the user may not be compensated for submission of the system defect since the system defect was determined to be duplicate of an existing defect submitted earlier. Note that the online system compensates users that submitted system defects, provided the system defects are not determined to be duplicates of existing system defects.

The use of the scores affects the user interactions with the system and thereby improves the efficiency of the system since users are encouraged to submit more de-duplication rules and make them effective, thereby reducing the number of defects that are processed by the system. The mechanism disclosed reverses the incentives provided to users from incentive to submit duplicative defects (in an attempt to earn rewards provided by the online system for submitted defects) that increases the duplicative defects in the system to an incentive to submit de-duplication rules (for earning rewards provided by the online system for submitted de-duplication rules) that decreases the number of (active) duplicative defects in the system. The system motivates submitters to submit de-duplication rules thereby automating the detection of duplicate defects and minimizing the cost and efforts of dealing with duplicate defects. As a result, the system consumes fewer computing resources for processing the defects. As defects are marked as duplicates, there are fewer interactions with the system related to these defects, thereby improving efficiency of usage of network bandwidth of the system. Furthermore, defects that are marked as duplicate may be eliminated from the system, thereby improving memory usage of the system as well as storage efficiency of the system.

The score of a deduplication rule is also determined based on a number of system defects that were determined to be erroneously marked as duplicates based on a matching performed by the de-duplication rule. The score of a de-duplication rule may be used for ranking the de-duplication rules, for example, while displaying the de-duplication rules via a user interface. The score of a de-duplication rule may be used to determine a type of message sent to a user that provided the de-duplication rule. The score of a de-duplication rule may be used to determine a compensation provided to a user that provided the de-duplication rule The task creation module 240 creates tasks associated with de-duplication rules or system defects. For example, if the system marks a system defect as duplicate and closes it and subsequently receives a user interaction associated with the system defect, the task creation module 240 creates a task for a system administrator to review the system defect and determine whether the system defect was accurately determined to be a duplicate. The task may also request the system administrator to review the de-duplication rule that was used to erroneously determine that a system defect is a duplicate of another system defect.

Processes

Various processes executed by the online system 120 are illustrated in FIGS. 3-6. Various embodiments can perform the steps of these flowcharts in different orders. Furthermore, various embodiments can include different and/or additional steps than the ones described herein.

Figure 3:
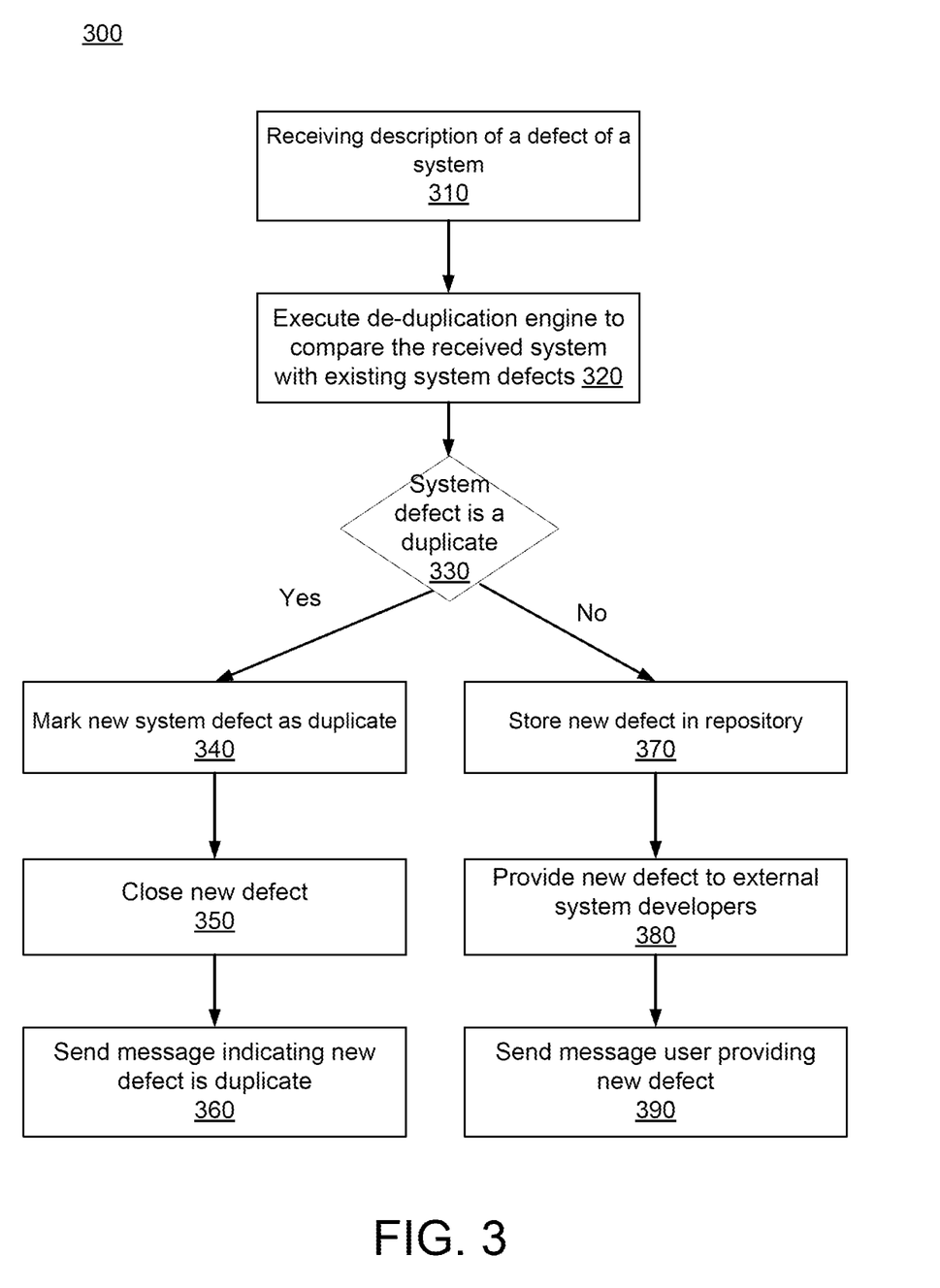
FIG. 3 is a flow chart illustrating the process of determining whether a new system defect is a duplicate of another existing system defect according to an embodiment.

FIG. 3 is a flow chart illustrating the process 300 of determining whether a new system defect is a duplicate of another existing system defect according to an embodiment. The system receives 310 a description of a defect in a software system provided by a user. The system may assign a unique identifier for the received system defect. The system executes 320 the de-duplication engine 160 to compare the received system defect with existing system defects. The system determines 330 based on the result of execution of the de-duplication engine 160 whether the received system defect is a duplicate of an existing system defect.

If the system determines 330 based on the result of execution of the de-duplication engine 160 that the received system defect is a duplicate of an existing system defect, the system performs the steps 340, 350, and 360. Accordingly, the system marks 340 the new system defect as a duplicate. The system may store information identifying the original system defect of which the new system defect is determined to be a duplicate of. The system closes 350 the new system defect, i.e., marks the new system defect as inactive or a system defect that does not need to be processed or reported. The system may send 360 a message to the user that provided the system defect indicating that the new system defect was determined to be a duplicate of an existing system defect.

If the system determines 330 based on the result of execution of the de-duplication engine 160 that the received system defect is not a duplicate of an existing system defect, the system performs the steps 370, 380, and 390. Accordingly, the system stores the new system defect as an original system defect in a repository, for example, the system defect store 150. The system may provide 380 information describing the new system defect to developers of the external system for which the system defect was identified. The system may send 390 a message to the user providing the system defect that the new system defect was determined to be an original system defect, i.e., a system defect that is not a duplicate of an existing system defect.

Figure 4:
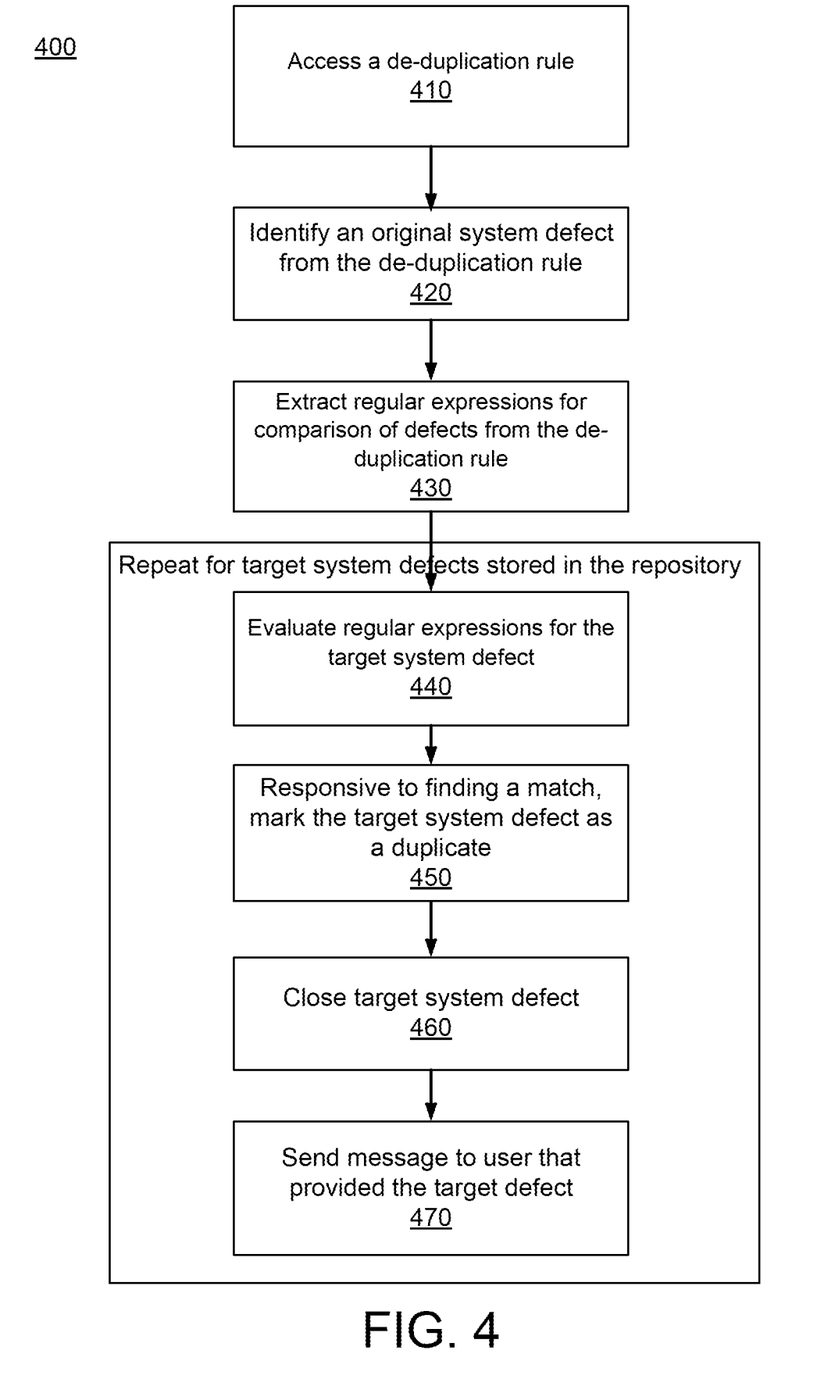
FIG. 4 is a flow chart illustrating the process of de-duplication of system defects according to an embodiment.

FIG. 4 is a flow chart illustrating the process 400 of de-duplication of system defects according to an embodiment. The system accesses 410 a de-duplication rule. The system may access the de-duplication rule because the de-duplication rule was just submitted by a user. Alternatively, the system may access de-duplication rule in an offline mode to identify duplicate system defects from previously acquired system defects.

The system identifies 420 an original system defect based on the de-duplication rule. The original system defect is the system defect with which other system defects are compared by the de-duplication rule. The system further extracts 430 one or more regular expressions specified by the de-duplication rule for comparing various portions of system defects rules.

The system repeats the steps 440, 450, 460, and 470 for multiple target system defects that were reported for the same system for which the original system defect was reported. The system evaluates 440 the one or more regular expressions for the target system defect. If the system finds a match based on the evaluation of the regular expressions, the system marks 450 the target system defect as a duplicate of the source system defect.

In an embodiment, the system compares the time stamps when each of the source and target system defects were received by the system and marks the system defect that was received earlier as the original system defect associated with the de-duplication rule and marks the system defect that was received later as the duplicate.

Accordingly, the system closes 460 the system defect that is determined to be a duplicate. The system may optionally send 470 a message to the user that provided the target system defect, for example, a message informing the user that the system defect provided by the user is a duplicate of another system defect.

Figure 5:
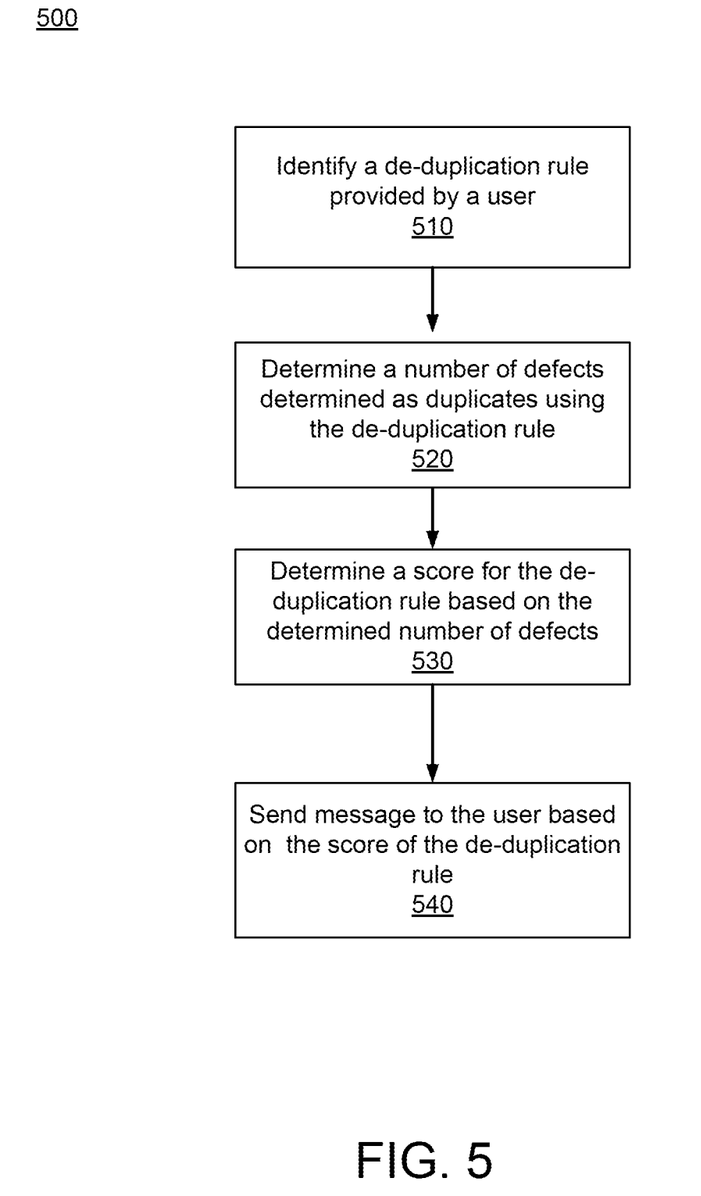
FIG. 5 is a flow chart illustrating the process of scoring de-duplication rules according to an embodiment.

FIG. 5 is a flow chart illustrating the process 500 of scoring de-duplication rules according to an embodiment. The system identifies 510 a de-duplication rule for scoring. The system determines 520 various factors relevant for scoring the identified de-duplication rule based on the significance of the de-duplication rule. For example, the system determines a number of defects determined as duplicates of the identified system defect based on one or more de-duplication rules. The system determines 530 a score for the de-duplication rule based on various factors, for example, the number of defects determined as duplicates of the identified system defect. The system sends 540 a message based on the score to the user that submitted the deduplication rule. For example, the system may report the score of the de-duplication rule to the user. In an embodiment, the system compensates the use that provided the de-duplication rule based on the score of the de-duplication rule. Accordingly, the user gets higher compensation if the de-duplication rule provided by the user is used to detect a large number of duplicate system defects. The compensation of the user reflects the saving in computing resources and human resources achieved by the online system and the external system based on the de-duplication rule. In an embodiment, the scores of de-duplication rules are used for ranking the de-duplication rules. For example, the de-duplication rules may be displayed on a dashboard to a system administer. The online system ranks the de-duplication rules based on the scores so that significant de-duplication rules with higher scores are shown higher in the rank or are shown more prominently compared to de-duplication rules with lower scores.

In an embodiment, a user can submit de-duplication rules for identifying duplicate de-duplication rules. Accordingly, the de-duplication rule compares two de-duplication rules using regular expressions applied to different portions of de-duplication rules. The de-duplication rule identifies a source de-duplication rule and one or more regular expressions for comparing the de-duplication rule with other de-duplication rules. The system uses such de-duplication to compare de-duplication rules and eliminate duplicate de-duplication rules. If two de-duplication rules are determined to match, the system keeps the de-duplication rule that was received earlier and removes the de-duplication rule that was provided later as the duplicate.

Figure 6:
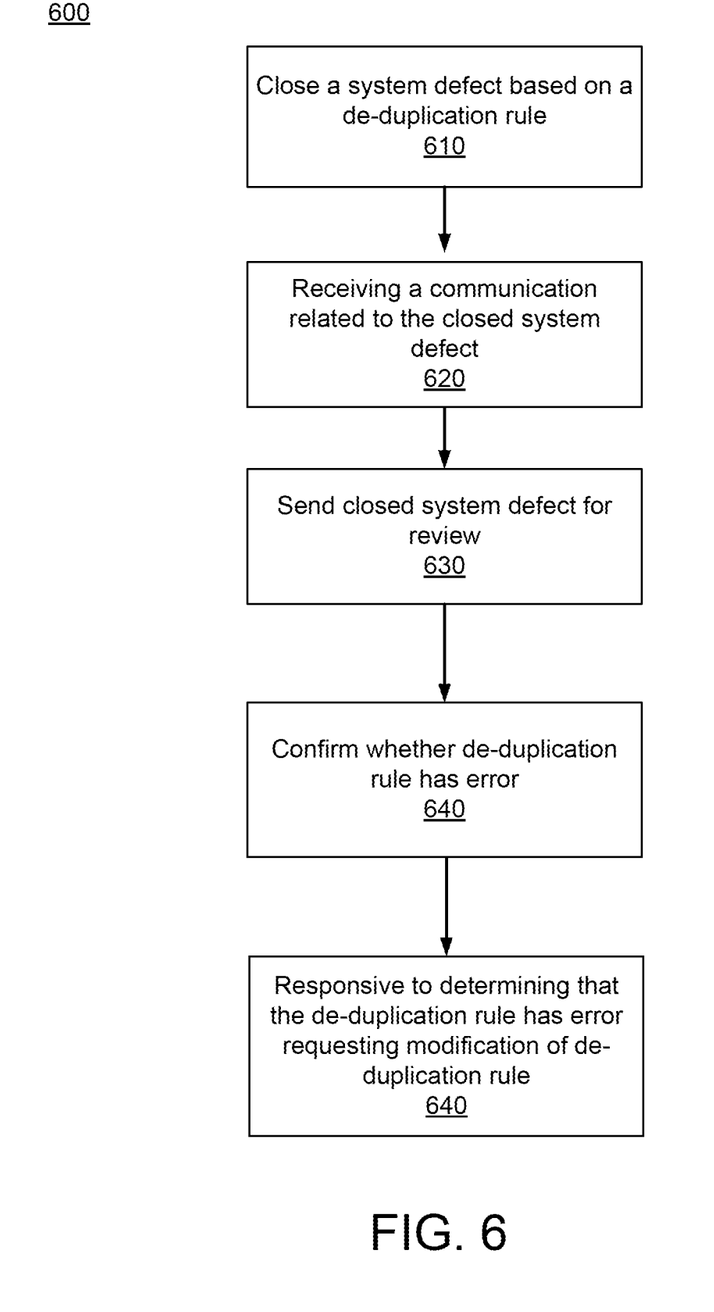
FIG. 6 is a flow chart illustrating the process of determining errors in de-duplication rules according to an embodiment.

FIG. 6 is a flow chart illustrating the process 600 of determining errors in de-duplication rules according to an embodiment. Accordingly, the online system 120 catches mistakes or errors in de-duplication rules. If the online system receives an interaction, for example, a reply from a researcher for a submission that has been closed by the system, the online system creates a task for an expert to manually review the interaction, for example, the reply or a comment by a user. If a determination is made that there is an error in the de-duplication rule, the rule may be adjusted. If a determination is made that there is no error in the de-duplication rule, an agent or an expert may provide explanation to the researcher describing why a duplicate state for the system defect is valid.

The system may close 610 a system defect based on a de-duplication rule. However, the system receives 620 a communication related to the closed system defect. The system sends 630 the closed system defect for review, for example, by a system administrator or an expert user. The system may further send the de-duplication rule for review to an expert and confirm 640 from the expert whether the de-duplication rule has an error. If the system determines that the de-duplication rule has error, the system requests modification of the de-duplication rule from the user that provided the de-duplication rule. The system may suspend the execution of the de-duplication rule until the error is fixed by modifying the de-duplication rule. The system may delete the de-duplication rule if the de-duplication rule is not modified for more than a threshold time after being reported as an erroneous de-duplication rule.

Computer Architecture

Figure 7:
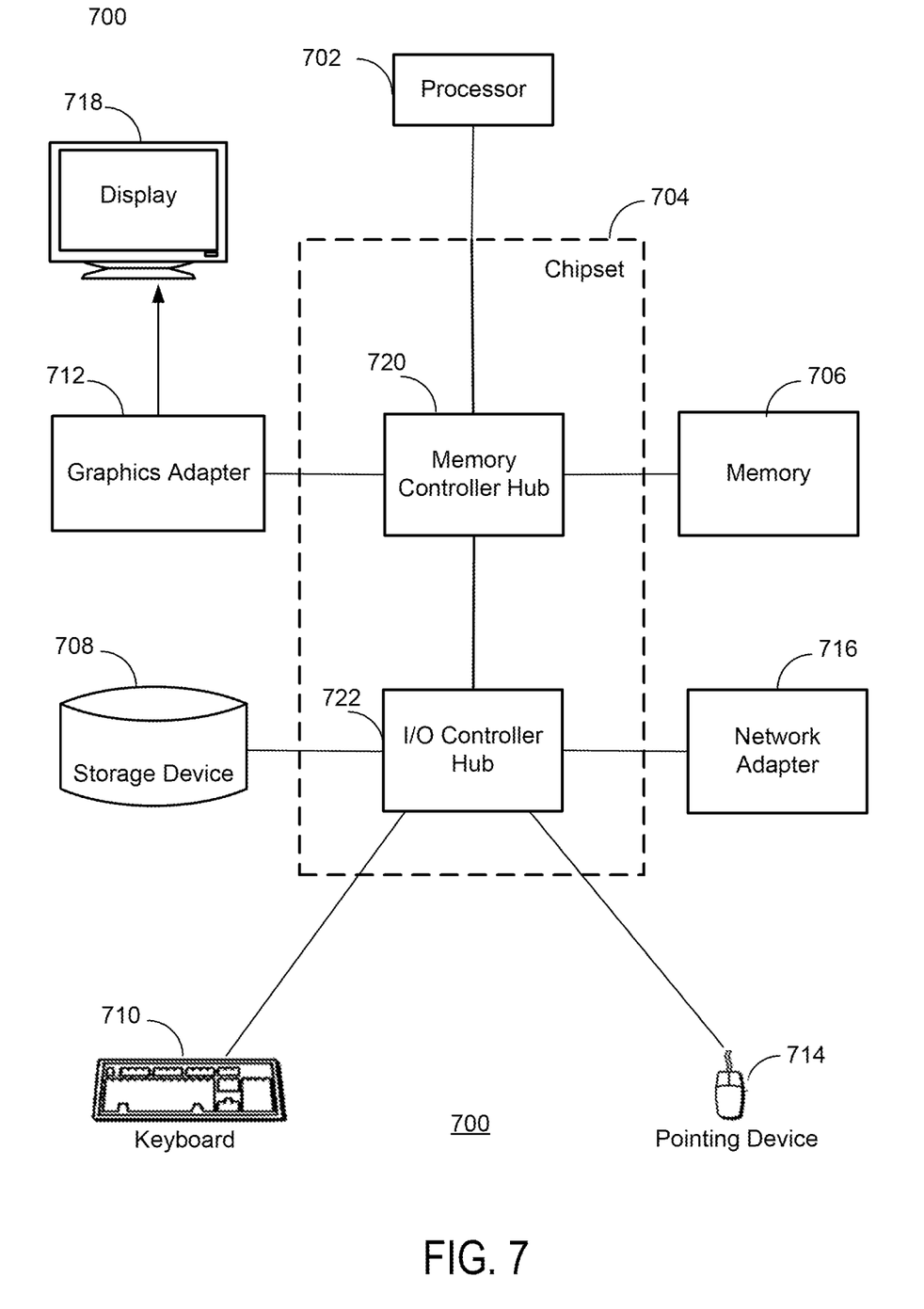
FIG. 7 is a block diagram illustrating a functional view of a typical computer system according to one embodiment.

FIG. 7 is a high-level block diagram illustrating a functional view of a typical computer system for use as one of the entities illustrated in the environment 100 of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as a multi-tenant system 120 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 115 may be a mobile phone with limited processing power, a small display 718, and may lack a pointing device 714. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer implemented method for de-duplication of system defects, the method comprising:
    storing records describing system defects for a plurality of external systems, each system defect associated with an external system;
    configuring a user interface for display via a client device, the user interface displaying information stored in records describing system defects;
    receiving, one or more de-duplication rules, each de-duplication rule configured to receive a description of an input system defect and determine whether the input system defect is a duplicate of an original system defect associated with the de-duplication rule, the de-duplication rule specifying one or more regular expressions, wherein the input system defect is determined to be a duplicate responsive to satisfying the one or more regular expressions;
    executing a particular de-duplication rule configured to determine duplicate system defects for a particular system defect associated with a particular external system, the executing comprising whether a target system defect specified for the particular external system satisfies the one or more regular expressions specified by the de-duplication rule;
    determining based on the execution of the one or more regular expressions that the target system defect specified for the particular external system is a duplicate of the particular system defect; and
    storing in a record describing the target system defect, information indicating that the target system defect is a duplicate.

2. The method of claim 1, wherein a record describing a system defect comprises one or more components, wherein each regular expression of a de-duplication rule is associated with a component of the system defect of the de-duplication rule.

3. The method of claim 1, wherein one or more system defects include unstructured text describing a difference between an implemented feature of the external system and an expected feature.

4. The method of claim 1, further comprising:
    closing the target system defect, the closing comprising indicating that the target system defect will not follow a workflow for fixing the target system defect.

5. The method of claim 1, further comprising:
    communicating with the user providing the target system defect, wherein the communication depends on whether the target system defect is a duplicate.

6. The method of claim 1, further comprising:
    determining a score for a de-duplication rule, the score indicating a significance of the de-duplication rule, wherein the score is determined based on a number of system defects determined to be duplicates based on the de-duplication rule.

7. The method of claim 6, further comprising:
    communicating with the user providing the de-duplication rule, wherein the communication depends on the score of the de-duplication rule.

8. The method of claim 6, further comprising:
    ranking a plurality of de-duplication rules based on the scores of each of the plurality of de-duplication rules; and
    sending the ranked de-duplication rules for presentation via a user interface.

9. A non-transitory computer readable storage medium storing instructions that when executed by one or more computer processors cause the one or more computer processors to perform steps comprising:

storing records describing system defects for a plurality of external systems, each system defect associated with an external system;

configuring a user interface for display via a client device, the user interface displaying information stored in records describing system defects;

receiving, one or more de-duplication rules, each de-duplication rule configured to receive a description of an input system defect and determine whether the input system defect is a duplicate of an original system defect associated with the de-duplication rule, the de-duplication rule specifying one or more regular expressions, wherein the input system defect is determined to be a duplicate responsive to satisfying the one or more regular expressions;

executing a particular de-duplication rule configured to determine duplicate system defects for a particular system defect associated with a particular external system, the executing comprising whether a target system defect specified for the particular external system satisfies the one or more regular expressions specified by the de-duplication rule;

determining based on the execution of the one or more regular expressions that the target system defect specified for the particular external system is a duplicate of the particular system defect; and storing in a record describing the target system defect, information indicating that the target system defect is a duplicate.

10. The non-transitory computer readable storage medium of claim 9, wherein a record describing a system defect comprises one or more components, wherein each regular expression of a de-duplication rule is associated with a component of the system defect of the de-duplication rule.

11. The non-transitory computer readable storage medium of claim 9, wherein one or more system defects include unstructured text describing a difference between an implemented feature of the external system and an expected feature.

12. The non-transitory computer readable storage medium of claim 9, wherein the instructions further cause the one or more computer processors to perform steps comprising:

closing the target system defect, the closing comprising indicating that the target system defect will not follow a workflow for fixing the target system defect.

13. The non-transitory computer readable storage medium of claim 9, wherein the instructions further cause the one or more computer processors to perform steps comprising:

communicating with the user providing the target system defect, wherein the communication depends on whether the target system defect is a duplicate.

14. The non-transitory computer readable storage medium of claim 9, wherein the instructions further cause the one or more computer processors to perform steps comprising:

determining a score for a de-duplication rule, the score indicating a significance of the de-duplication rule, wherein the score is determined based on a number of system defects determined to be duplicates based on the de-duplication rule.

15. The non-transitory computer readable storage medium of claim 14, wherein the instructions further cause the one or more computer processors to perform steps comprising:

communicating with the user providing the de-duplication rule, wherein the communication depends on the score of the de-duplication rule.

16. The non-transitory computer readable storage medium of claim 14, wherein the instructions further cause the one or more computer processors to perform steps comprising:

ranking a plurality of de-duplication rules based on the scores of each of the plurality of de-duplication rules; and sending the ranked de-duplication rules for presentation via a user interface.

17. A computer system comprising:

one or more computer processors; and a non-transitory computer readable storage medium storing instructions that when executed by the one or more computer processors cause the one or more computer processors to perform steps comprising:

storing records describing system defects for a plurality of external systems, each system defect associated with an external system;

configuring a user interface for display via a client device, the user interface displaying information stored in records describing system defects;

receiving, one or more de-duplication rules, each de-duplication rule configured to receive a description of an input system defect and determine whether the input system defect is a duplicate of an original system defect associated with the de-duplication rule, the de-duplication rule specifying one or more regular expressions, wherein the input system defect is determined to be a duplicate responsive to satisfying the one or more regular expressions;

executing a particular de-duplication rule configured to determine duplicate system defects for a particular system defect associated with a particular external system, the executing comprising whether a target system defect specified for the particular external system satisfies the one or more regular expressions specified by the de-duplication rule;

determining based on the execution of the one or more regular expressions that the target system defect specified for the particular external system is a duplicate of the particular system defect; and storing in a record describing the target system defect, information indicating that the target system defect is a duplicate.

18. The computer system of claim 17, wherein the instructions further cause the one or more computer processors to perform steps comprising:

closing the target system defect, the closing comprising indicating that the target system defect will not follow a workflow for fixing the target system defect.

19. The computer system of claim 17, further comprising:

determining a score for a de-duplication rule, the score indicating a significance of the de-duplication rule, wherein the score is determined based on a number of system defects determined to be duplicates based on the de-duplication rule.

20. The computer system of claim 19, further comprising:

ranking a plurality of de-duplication rules based on the scores of each of the plurality of de-duplication rules; and sending the ranked de-duplication rules for presentation via a user interface.

* * * * *